(12) United States Patent
Cai

(10) Patent No.: US 12,552,576 B2
(45) Date of Patent: Feb. 17, 2026

(54) ANTI-LEAKAGE PAPER CONTAINERS

(71) Applicant: ZHEJIANG SOWINPAK CO., LTD., Zhejiang (CN)

(72) Inventor: Mingxi Cai, Wenzhou (CN)

(73) Assignee: ZHEJIANG SOWINPAK CO., LTD., Wenzhou (CN)

( * ) Notice: Subject to any disclaimer, the term of this patent is extended or adjusted under 35 U.S.C. 154(b) by 140 days.

(21) Appl. No.: 18/508,178

(22) Filed: Nov. 13, 2023

(65) Prior Publication Data
US 2025/0153886 A1    May 15, 2025

(51) Int. Cl.
| | |
|---|---|
| *B65D 3/06* | (2006.01) |
| *B32B 27/08* | (2006.01) |
| *B32B 27/30* | (2006.01) |
| *B32B 27/32* | (2006.01) |
| *B65D 3/10* | (2006.01) |
| *B65D 3/22* | (2006.01) |

(52) U.S. Cl.
CPC .............. *B65D 3/22* (2013.01); *B32B 27/08* (2013.01); *B32B 27/306* (2013.01); *B32B 27/32* (2013.01); *B65D 3/06* (2013.01); *B65D 3/10* (2013.01); *B32B 2270/00* (2013.01); *B32B 2307/718* (2013.01); *B32B 2439/02* (2013.01)

(58) Field of Classification Search
CPC ... B65D 3/22; B65D 3/06; B65D 3/10; B65D 3/28; B65D 81/3874; B65D 25/36; B65D 1/265; B65D 1/40; B32B 27/08; B32B 27/306; B32B 27/32; B32B 2307/718; B32B 2439/02; B29C 66/72328; B29C 66/112

USPC .......... 229/400, 4.5, 403, 198.2, 5.5, 87.08; 220/62.12, 62.2; 493/106, 108, 158, 903, 493/906

See application file for complete search history.

(56) References Cited

U.S. PATENT DOCUMENTS

| | | | | |
|---|---|---|---|---|
| 2,969,901 A | * | 1/1961 | Behrens ................... | B65D 3/10 229/5.5 |
| 6,253,995 B1 | * | 7/2001 | Blok .................. | B65D 81/3869 229/940 |
| 7,458,504 B2 | * | 12/2008 | Robertson .......... | B65D 81/3869 220/62.12 |
| 8,113,416 B2 | * | 2/2012 | Yan ........................ | B31B 50/64 229/4.5 |

FOREIGN PATENT DOCUMENTS

JP     4998022 B2  *  8/2012  ........... B29C 66/112

* cited by examiner

*Primary Examiner* — Christopher R Demeree
(74) *Attorney, Agent, or Firm* — PORUS IP LLC

(57) ABSTRACT

Embodiments of the present disclosure provide an anti-leakage paper container, comprising a container wall and a container bottom. A lower end of the container wall is connected with the container bottom. The container wall is composed of a connecting cardboard. The connecting cardboard includes a first side and a second side. The first side and the second side lap each other to form a cylinder, and the first side is located on an inner side of the cylinder. An inner surface and an outer surface of the container wall and an inner surface and an outer surface of the container bottom are equipped with a lamination layer, respectively. The first side is provided with a film wrapping edge, and the first side is wrapped within the film wrapping edge.

17 Claims, 3 Drawing Sheets

ANTI-LEAKAGE PAPER CONTAINERS

TECHNICAL FIELD

The present disclosure relates to the field of paper containers, and in particular, to an anti-leakage paper container.

BACKGROUND

Paper containers (e.g., paper cups or paper bowls) are eco-friendly liquid containment vessels, which is highly favored by consumers and widely used. To address the issue of liquid leakage, it is common practice to apply a lamination layer to an inner surface and an outer surface of the paper container's substrate. However, due to the size and location of cut edges of the substrate, it is challenging to apply the lamination layer to the edges. When liquids come into contact with the edges of the paper container's substrate, some colored or highly permeable liquids may easily seep through the edges, leading to leakage and affecting usability. Therefore, it is necessary to provide an anti-leakage paper container.

SUMMARY

One or more embodiments of the present disclosure provide an anti-leakage paper container. The anti-leakage paper container may include a container wall and a container bottom. An upper end of the container wall may be provided with an outer rolled edge, and a lower end of the container wall may be connected with the container bottom. The container wall may be composed of a connecting cardboard. The connecting cardboard may include a first side and a second side. The first side and the second side may lap each other to form a cylinder. The cylinder may have a conical degree. The first side may be located on an inner side of the cylinder. An inner surface and an outer surface of the container wall and an inner surface and an outer surface of the container bottom may be equipped with a lamination layer, respectively. The first side may be provided with a film wrapping edge. The first side may be wrapped within the film wrapping edge.

In some embodiments, an overlapping region may exist between the first side and the second side, and a width of the overlapping region may be in a range of 3 mm-5 mm.

In some embodiments, the first side may be connected with the second side by at least one of gluing, heat sealing, and ultrasonic welding.

In some embodiments, a cut edge of the first side may be wrapped within the film wrapping edge.

In some embodiments, a wrapping depth of the film wrapping edge may be in a range of 8 mm-14 mm.

In some embodiments, the wrapping depth of the film wrapping edge may be greater than or equal to 1.6 times of the width of the overlapping region.

In some embodiments, the film wrapping edge may be connected with the first side by at least one of gluing, heat sealing, and ultrasonic welding.

In some embodiments, a material of the film wrapping edge may include a composite barrier film.

In some embodiments, the composite barrier film may be a mixed film coextruded by LLDPE and LDPE.

In some embodiments, a mixing ratio of LLDPE to LDPE of the mixed film coextruded by LLDPE and LDPE may be 1:3.

In some embodiments, the film wrapping edge may be in a range of 8 gsm-10 gsm.

In some embodiments, the lamination layer may be compounded on the inner surface and outer surface of the container wall and the inner surface and outer surface of the container bottom through multi-layer coextrusion casting.

In some embodiments, lamination layer may be a mixed film coextruded by polyethylene (PE) and ethylene vinyl acetate (EVA).

In some embodiments, a mixing ratio of PE to EVA of the mixed film coextruded by PE and EVA may be 7:3.

In some embodiments, the lamination layer may be in a range of 30 gsm-40 gsm.

In some embodiments, the connecting cardboard may be a fan-ring cardboard.

In some embodiments, the container bottom may be a nest bottom structure.

In some embodiments, an outer edge of the container bottom may have a lower folded edge, the lower end of the container wall may have an upper folded edge, and the lower folded edge may be snap-fit in the upper folded edge.

In some embodiments, the container bottom may be connected with the lower end of the container wall through roll forming.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
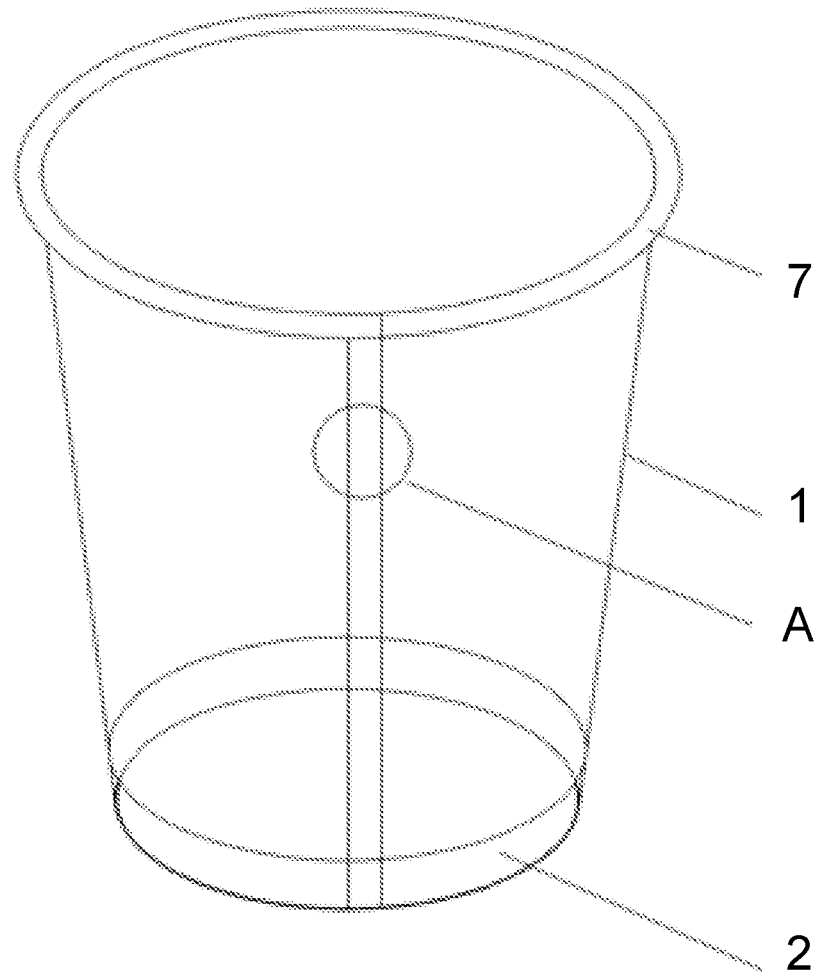
FIG. 1 is a schematic diagram illustrating a structure of an anti-leakage paper container according to some embodiments of the present disclosure.

In order to provide a clearer understanding of the technical solutions in the embodiments of the present disclosure, a brief introduction to the drawings required for the description of the embodiments will be provided below. It is evident that the drawings described below are merely examples or embodiments of the present disclosure, and for those skilled in the art, without creative effort, the present disclosure may be applied to other similar scenarios based on these drawings. Unless explicitly indicated otherwise from the context or stated otherwise, identical reference numerals in the figures represent the same structures or operations.

As shown in the present disclosure and the claims, unless context clearly indicates otherwise, words such as "one," "an," "a," "one kind," and/or "the" are not limited to singular forms and may also include plural forms. In general, the terms "comprising" and "including" only indicate the inclusion of explicitly identified steps and elements, and these steps and elements do not constitute an exclusive list; methods or devices may also include other steps or elements.

Some embodiments of the present disclosure provide an anti-leakage paper container (referred to as a "paper container"), including a container wall and a container bottom. The container wall may be composed of a connecting cardboard including a first side and a second side, and the first side and the second side may lap each other to form a cylinder. An inner surface and an outer surface of the container wall and an inner surface and an outer surface of the container bottom may be equipped with a lamination layer, respectively. The first side located on an inner side of the cylinder may be provided with a film wrapping edge. A cut edge of the first side may be wrapped within the film wrapping edge, thereby effectively preventing a colored or highly permeable liquid from leaking through the cut edge and enhancing anti-leakage capability of the paper container.

Figure 2:
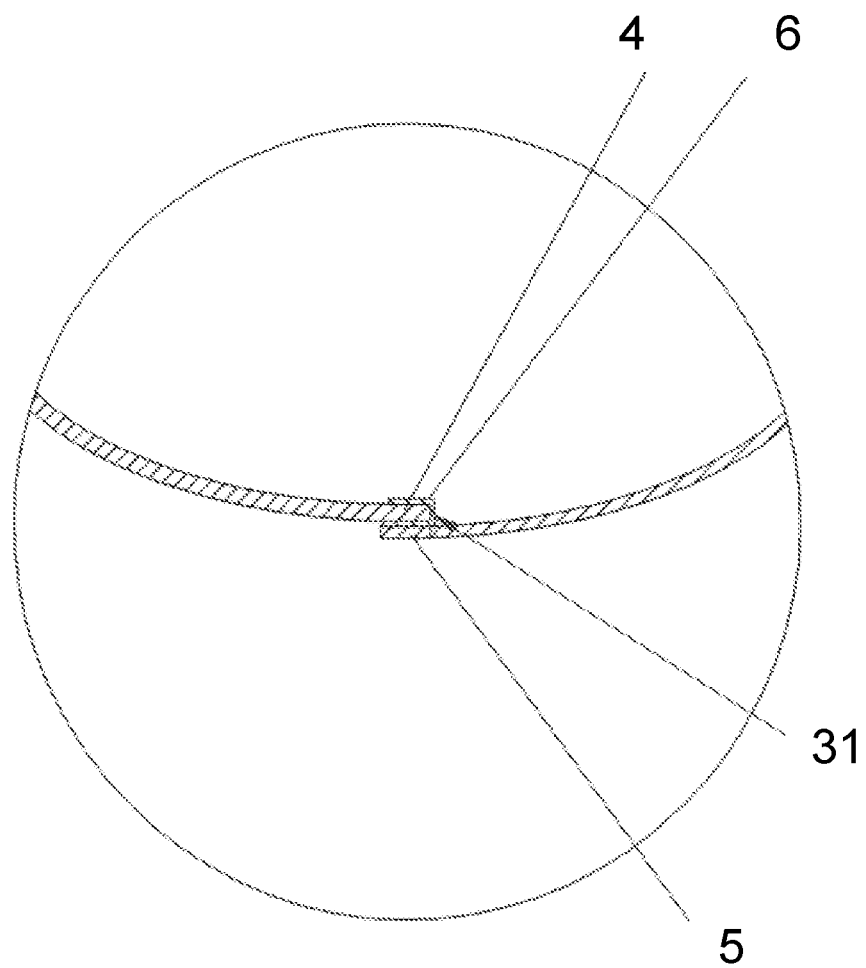
FIG. 2 is a cross-sectional view illustrating section A in FIG. 1.
Figure 3:
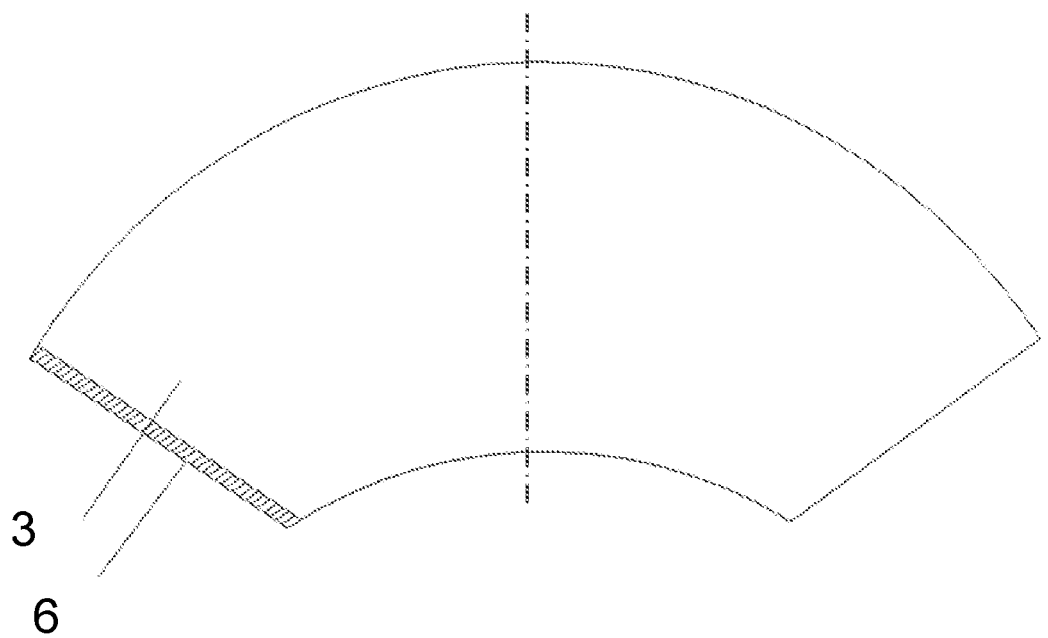
FIG. 3 is a schematic diagram illustrating a structure of a connecting cardboard according to some embodiments of the present disclosure.

FIG. 1 is a schematic diagram illustrating a structure of the anti-leakage paper container according to some embodiments of the present disclosure. FIG. 2 is a cross-sectional view illustrating section A in FIG. 1. FIG. 3 is a schematic diagram illustrating a structure of a connecting cardboard according to some embodiments of the present disclosure.

As shown in FIGS. 1-3, the anti-leakage paper container may include a container wall 1 and a container bottom 2. An upper end of the container wall 1 may be provided with an outer rolled edge 3, and a lower end of the container wall 1 may be connected with the container bottom 2. The container wall 1 may be composed of a connecting cardboard 4. The connecting cardboard 4 may include a first side 5 and a second side 6. The first side 5 and the second side 6 may lap each other to form a cylinder. The cylinder may have a conical degree, and the first side 5 may be located on an inner side of the cylinder. An inner surface and an outer surface of the container wall 1 and an inner surface and an outer surface of the container bottom 2 may be equipped with a lamination layer, respectively. The first side 5 may be provided with a film wrapping edge 7. The first side 5 may be wrapped within the film wrapping edge 7.

The container bottom 2 refers to a bottom of the paper container. It should be noted that a material of the paper container may include but is not limited to pulp, polylactic acid (PLA), etc.

In some embodiments, the container bottom 2 may be a nest bottom structure. In some embodiments, an outer edge of the container bottom 2 may have a lower folded edge. The lower end of the container wall 1 may have an upper folded edge. The lower folded edge may be snap-fit in the upper folded edge.

In some embodiments, the container bottom 2 may be connected with the lower end of the container wall 1 through roll forming. In some embodiments, the lower folded edge of the container bottom 2 may be snap-fit in the upper folded edge of the container wall 1, and the container bottom 2 may be tightly connected with the container wall 1 through roll forming.

In some embodiments, the container bottom 2 may also be another structure, for example, a flat bottom structure, etc.

In some embodiments of the present disclosure, by using the nest bottom structure as the container bottom, providing the outer edge of the container bottom with the lower folded edge and the lower end of the container wall with the upper folded edge, and snap-fitting the lower folded edge in the upper folded edge and then undergoing roll forming, the container bottom can be tightly connected with the container wall to form the paper container, and the basic usability of the paper container can be ensured.

The container wall 1 refers to a side wall of the paper container. In some embodiments, the upper end of the container wall 1 may be provided with the outer roller edge 3. The outer rolled edge 7 refers to an edge formed by rolling an outer edge of the upper end of the container wall 1 outwards. By providing the outer rolled edge 7, smooth processing of the outer edge of the upper end of the container wall 1 may be reduced, thereby saving production costs and improving user experience.

In some embodiments, the container wall 1 may be composed of the connecting cardboard 4, which is obtained through die-cutting. An outer edge of the connecting cardboard 4 may form a cut edge 41.

As shown in FIG. 1 and FIG. 3, the connecting cardboard 4 may be a fan-ring cardboard. In some embodiments, when the connecting cardboard 4 is the fan-ring cardboard, the cylinder formed by lapping the first side 5 and the second side 6 may have a conical degree. In some embodiments, the conical degree may be reflected in a gradual decrease in a diameter of the paper container along a direction (e.g., an X-direction shown by an arrow in FIG. 1) from an upper end of the paper container to a lower end of the paper container. It is understood that as the cylinder has the conical degree, the container bottom 2 may better sleeve the lower end of the container wall to for tight connection.

In some embodiments, the connecting cardboard 3 may also be a cardboard with another structural shape, as long as two sides of the cardboard may lap each other to form the cylinder. For example, the connecting cardboard 4 may also be a rectangular cardboard, etc. It is understood that a shape of the cylinder formed by the connecting cardboard 4 with a different structural shape may be different (e.g., a shape of the lower end of the container wall 1 may be different). Therefore, in order to ensure that the container bottom 2 is tightly connected with the lower end of the container wall 1, the container bottom 2 and the lower end of the container wall 1 may be set correspondingly.

The first side 5 and the second side 6 may be regions on two sides of a centerline of the connecting cardboard 4. In some embodiments, the first side 5 and the second side 6 may lap each other to form the cylinder. In some embodiments, lapping each other may be understood as that the first side 5 and the second side 5 partially overlap with each other, i.e., an overlapping region may exist between the first side 5 and the second side 5.

The overlapping region refers to a region formed by lapping the first side 5 and the second side 6. In some embodiments, a width of the overlapping region may be in a range of 3 mm-5 mm. In some embodiments, the width of the overlapping region may be in a range of 2 mm-3 mm. In some embodiments, the width of the overlapping region may be in a range of 3 mm-6 mm. In some embodiments, the width of the overlapping region may be in a range of 4 mm-6 mm. A contact area between the first side 5 and the second side 6 may be increased by controlling the width of the overlapping region in a reasonable range, thereby realizing the tight connection between the first side 5 and the second side 6.

It should be noted that, in a direction from the upper end of the container wall 1 to the lower end of the container wall 1, the width of the overlapping region between the first side 5 and the second side 6 may remain constant or vary, as long as the first side 5 is tightly connected with the second side 6.

In some embodiments, based on the overlapping of the first side 5 and the second side 6, the first side 5 may be tightly connected with the second side 6 in various ways. In some embodiments, the first side 5 may be connected with the second side 6 by at least one of gluing, heat sealing, or ultrasonic welding.

In some embodiments, the inner surface and the outer surface of the container wall 1 and the inner surface and the outer surface of the container bottom 2 may be equipped with the lamination layer, respectively.

The lamination layer refers to a protective film layer wrapping an inner surface and an outer surface of the paper container (i.e., the inner surface and t outer surface of the container wall 1 and the inner surface and outer surface of the container bottom 2). In some embodiments, the lamination layer may be compounded on the inner surface and the outer surface of the container wall 1 and the inner surface and the outer surface of the container bottom 2 through multi-layer coextrusion casting. The lamination layer may be disposed on the inner surface and the outer surface of the container wall 1 and the inner surface and the outer surface of the container bottom 2, so that liquids may be prevented from leaking through substrates of the container wall 1 and the container bottom 2, and the paper container may meet the basic requirements for holding the liquids.

It should be noted that the lamination layer may also be wrapped on the inner surface and outer surface of the container wall 1 and the inner surface and outer surface of the container bottom 2 in any feasible manner that effectively prevents liquid leakage.

In some embodiments, in order to ensure anti-leakage capability and use performance of the paper container, a material of the lamination layer may be preferably selected. In some embodiments, the material of the lamination layer may be a mixed film coextruded by polyethylene (PE) and ethylene vinyl acetate (EVA). A mixing ratio of PE to EVA may be 7:3. It is understood that the mixed film coextruded by PE and EVA has the characteristics of good stability and high temperature resistance, so that the anti-leakage capability and the use performance of the paper container can be effectively ensured by wrapping the inner and outer surfaces of the container wall 1 and the inner and outer surfaces of the container bottom 2, respectively with the mixed film coextruded by PE and EVA as the lamination layer.

It should be noted that the material of the lamination layer may also be another feasible material, as long as the anti-leakage requirements of the paper container. For example, the material of the lamination layer may also be PE, etc. In some embodiments, the lamination layer may be in a range of 30 gsm-40 gsm. In some embodiments, the lamination layer may be in a range of 20 gsm-30 gsm. In some embodiments, the lamination layer may be in a range of 20 gsm-35 gsm. In some embodiments, the lamination layer may be in a range of 35 gsm-45 gsm. In some embodiments, the lamination layer may be in a range of 30 gsm-50 gsm.

By controlling the thickness of the lamination layer to be in an appropriate range, the anti-leakage and anti-corrosion properties of the paper container can be effectively enhanced, thereby improving the usability and durability of the paper container.

In some embodiments, the first side 5 may be provided with the film wrapping edge 7, and the first side 5 may be wrapped within the film wrapping edge 7. In some embodiments, the cut edge 41 of the first side 5 may be wrapped inside the film wrapping edge 7. It is understood that by wrapping the first side 5 within the film wrapping edge 7 or by only wrapping the cut edge 41 of the first side 4 within the film wrapping edge 7, the film wrapping edge 7 may protect and isolate the cut edge 41, which is either not wrapped by or not fully wrapped by the lamination layer, effectively preventing the colored or highly permeable liquid from leaking through the cut edge 41.

In some embodiments, a wrapping depth of the film wrapping edge 7 may be in a range of 8 mm-14 mm. In some embodiments, the wrapping depth of the film wrapping edge 7 may be in a range of 6 mm-10 mm. In some embodiments, the wrapping depth of the film wrapping edge 7 may be in a range of 12 mm-14 mm. In some embodiments, the wrapping depth of the film wrapping edge 7 may be in a range of 12 mm-16 mm. By providing an appropriate wrapping depth of the film wrapping edge 7, the cut edge 41 of the first side 5 may be further protected and isolated.

In some embodiments, the wrapping depth of the film wrapping edge 7 may have a corresponding relationship with the width of the overlapping region between the first side 5 and the second side 6. In some embodiments, the wrapping depth of the film wrapping edge 7 may be greater than 1.6 times of the width of the overlapping region. For example, when the wrapping depth of the film wrapping edge 7 is 8 mm, the width of the overlapping region may be 3 mm. As another example, when the wrapping depth of the film wrapping edge 7 is 14 mm, the width of the overlapping region may be 5 mm.

In some embodiments, the film wrapping edge 7 may be connected with first side 5 by at least one of gluing, heat sealing, or ultrasonic welding. In some embodiments, the film wrapping edge 7 may also be connected with the first side 4 in any other feasible manner.

In some embodiments, in order to ensure the anti-leakage capacity of the film wrapping edge 7, a material of the film wrapping edge 7 may be preferably selected. In some embodiments, the material of the film wrapping edge 7 may include a composite barrier film. In some embodiments, the composite barrier film may be a mixed film coextruded by Linear low-density polyethylene (LLDPE) and low-density polyethylene (LDPE). A mixing ratio of LLDPE to LDPE may be 1:3, etc.

It should be noted that the material of the film wrapping edge 7 may also be another type of film as long as the film meets the anti-leakage requirements of the film wrapping edge 7.

It is understood that, due to good anti-leakage performance of the mixed film coextruded by LLDPE and LDPE, when the material of the film wrapping edge 7 is the mixed film coextruded by LLDPE and LDPE, the colored or highly permeable liquid may be more effectively prevented from leaking through the cut edge 41.

In some embodiments, the film wrapping edge 7 may be in a range of 8 gsm-10 gsm. In some embodiments, the film wrapping edge 7 may be in a range of 5 gsm-8 gsm. In some embodiments, the film wrapping edge 7 may be in a range of 7 gsm-10 gsm. In some embodiments, the film wrapping edge 7 may be in a range of 9 gsm-12 gsm.

By controlling the thickness of the film wrapping edge in an appropriate range, the anti-leakage capability of the film wrapping edge can be effectively enhanced, thereby improving the usability and durability of the paper container.

The basic concepts have been described above, and it is apparent to those skilled in the art that the foregoing detailed disclosure is intended as an example only and does not constitute a limitation of the present disclosure. Although not expressly stated herein, those skilled in the art may make various modifications, improvements, and amendments to the present disclosure. Such modifications, improvements, and amendments are suggested in the present disclosure, so such modifications, improvements, and amendments remain within the spirit and scope of the exemplary embodiments of the present disclosure.

What is claimed is:

1. An anti-leakage paper container, comprising a container wall and a container bottom, wherein an upper end of the container wall is provided with an outer rolled edge, and a lower end of the container wall is connected with the container bottom;

the container wall is composed of a connecting cardboard, the connecting cardboard includes a first side and a second side, the first side and the second side lap each other to form a cylinder, the cylinder has a conical degree, and the first side is located on an inner side of the cylinder;

an inner surface and an outer surface of the container wall and an inner surface and an outer surface of the container bottom are equipped with a lamination layer, respectively, the first side is provided with a film wrapping edge, and the first side is wrapped within the film wrapping edge;

a material of the film wrapping edge includes a composite barrier film;

the composite barrier film is a mixed film coextruded by LLDPE and LDPE; and a mixing ratio of LLDPE to LDPE of the mixed film coextruded by LLDPE and LDPE is 1:3.

2. The anti-leakage paper container of claim 1, wherein a width of an overlapping region between the first side and the second side is in a range of 3 mm-5 mm.

3. The anti-leakage paper container of claim 2, wherein the first side is connected with the second side by at least one of gluing, heat sealing, and ultrasonic welding.

4. The anti-leakage paper container of claim 2, wherein a cut edge of the first side is wrapped within the film wrapping edge.

5. The anti-leakage paper container of claim 4, wherein a wrapping depth of the film wrapping edge is in a range of 8 mm-14 mm, and the wrapping depth of the film wrapping edge is greater than or equal to 1.6 times of the width of the overlapping region.

6. The anti-leakage paper container of claim 4, wherein a wrapping depth of the film wrapping edge is in a range of 12 mm-14 mm.

7. The anti-leakage paper container of claim 1, wherein the film wrapping edge is connected with the first side by at least one of gluing, heat sealing, and ultrasonic welding.

8. The anti-leakage paper container of claim 1, wherein the film wrapping edge is in a range of 8 gsm-10 gsm.

9. The anti-leakage paper container of claim 1, wherein the lamination layer is compounded on the inner surface and outer surface of the container wall and the inner surface and outer surface of the container bottom through multi-layer coextrusion casting.

10. The anti-leakage paper container of claim 9, wherein the lamination layer is a mixed film coextruded by polyethylene (PE) and ethylene vinyl acetate (EVA), and a mixing ratio of PE to EVA of the mixed film coextruded by PE and EVA is 7:3.

11. The anti-leakage paper container of claim 10, wherein the lamination layer is in a range of 30 gsm-40 gsm.

12. The anti-leakage paper container of claim 1, wherein the connecting cardboard is a fan-ring cardboard.

13. The anti-leakage paper container of claim 12, wherein when the connecting cardboard is a fan-ring cardboard, a cylinder formed by lapping the first side and the second side has a conical degree.

14. The anti-leakage paper container of claim 13, wherein the conical degree is reflected in a gradual decrease in a diameter of the paper container along a direction from an upper end of the paper container to a lower end of the paper container.

15. The anti-leakage paper container of claim 1, wherein the container bottom is a nest bottom structure.

16. The anti-leakage paper container of claim 15, wherein an outer edge of the container bottom has a lower folded edge, the lower end of the container wall has an upper folded edge, and the lower folded edge is snap-fit in the upper folded edge.

17. The anti-leakage paper container of claim 15, wherein the container bottom is connected with the lower end of the container wall through roll forming.

* * * * *